(12) United States Patent
Bouchard et al.

(10) Patent No.: US 8,782,287 B2
(45) Date of Patent: Jul. 15, 2014

(54) METHODS AND APPARATUS FOR USING MULTIPLE REASSEMBLY MEMORIES FOR PERFORMING MULTIPLE FUNCTIONS

(75) Inventors: Gregg A. Bouchard, Round Rock, TX (US); Mauricio Calle, Austin, TX (US); Joel R. Davidson, Austin, TX (US); Michael W. Hathaway, Austin, TX (US); James T. Kirk, Austin, TX (US); Christopher Brian Walton, Austin, TX (US)

(73) Assignee: Agere Systems LLC, Allentown, PA (US)

( * ) Notice: Subject to any disclaimer, the term of this patent is extended or adjusted under 35 U.S.C. 154(b) by 1942 days.

(21) Appl. No.: 10/029,679

(22) Filed: Dec. 21, 2001

(65) Prior Publication Data

US 2003/0120798 A1 Jun. 26, 2003

(51) Int. Cl.
*G06F 15/16* (2006.01)
*H04L 12/56* (2006.01)
*H04L 12/54* (2013.01)

(52) U.S. Cl.
CPC .......... *H04L 49/9094* (2013.01); *H04L 49/90* (2013.01); *H04L 49/9042* (2013.01); *H04L 45/60* (2013.01); *H04L 12/5693* (2013.01); *H04L 45/00* (2013.01)
USPC ........... 709/250; 709/236; 709/230; 709/234; 709/232; 709/246

(58) Field of Classification Search
USPC ......... 709/250, 235, 236, 230, 234, 232, 246; 370/300
See application file for complete search history.

(56) References Cited

U.S. PATENT DOCUMENTS 4,149,143 A * 4/1979 Nagano et al. ................ 382/273
4,149,243 A * 4/1979 Wallis ........................... 718/106
(Continued)

FOREIGN PATENT DOCUMENTS

WO    WO 99/21326        4/1999
WO    WO 01/16682 A1     3/2001

OTHER PUBLICATIONS

E.P. Rathgeb et al., "Redundancy Concepts for a Large ATM Switching Node," XVI World Telecom Congress Proceedings, pp. 425-433, 1997.

(Continued)

*Primary Examiner* — Lan-Dai T Truong
(74) *Attorney, Agent, or Firm* — Ryan, Mason & Lewis, LLP

(57) ABSTRACT

A packet processing system comprises first processing circuitry for performing a first function, and first memory circuitry coupled to the first processing circuitry for storing received packets, wherein at least a portion of the packets stored by the first memory circuitry are usable by the first processing circuitry in accordance with the first function. The packet processing system further comprises at least second processing circuitry for performing a second function, and at least second memory circuitry coupled to the second processing circuitry for storing at least a portion of the same packets stored in the first memory circuitry, wherein at least a portion of the packets stored in the second memory circuitry are usable by the second processing circuitry in accordance with the second function. In an illustrative embodiment, the first processing circuitry and the second processing circuitry operate in a packet switching device such as a router. In such case, the first processing circuitry and the second processing circuitry operate between a packet network interface and a switch fabric of the packet switching device.

20 Claims, 3 Drawing Sheets

(56) References Cited

U.S. PATENT DOCUMENTS

| | | | | |
|---|---|---|---|---|
| 4,593,357 | A | * | 6/1986 | Van Ostrand et al. ............ 701/1 |
| 4,885,684 | A | * | 12/1989 | Austin et al. ................. 717/149 |
| 5,179,530 | A | * | 1/1993 | Genusov et al. ............. 708/520 |
| 5,623,494 | A | * | 4/1997 | Rostoker et al. ............. 370/397 |
| 6,058,114 | A | * | 5/2000 | Sethuram et al. ............ 370/397 |
| 6,249,528 | B1 | * | 6/2001 | Kothary ........................ 370/466 |
| 6,330,584 | B1 | * | 12/2001 | Joffe et al. .................... 718/107 |
| 6,483,839 | B1 | * | 11/2002 | Gemar et al. ........... 370/395.42 |
| 6,629,147 | B1 | * | 9/2003 | Grow ............................ 709/236 |
| 6,771,652 | B1 | * | 8/2004 | Aydemir et al. .............. 370/412 |
| 6,934,760 | B1 | * | 8/2005 | Westbrook et al. .......... 709/231 |
| 6,944,153 | B1 | * | 9/2005 | Buckland et al. ............. 370/376 |
| 7,092,393 | B1 | * | 8/2006 | Westbrook et al. .......... 370/394 |

OTHER PUBLICATIONS

G. Parulkar et al., "AITPM: A Strategy for Integrating IP with ATM," Computer Communication Review, No. 4, pp. 49-58, 1995.

* cited by examiner

METHODS AND APPARATUS FOR USING MULTIPLE REASSEMBLY MEMORIES FOR PERFORMING MULTIPLE FUNCTIONS

FIELD OF THE INVENTION

The present invention relates generally to packet processing systems, and more particularly to the use of multiple reassembly memories for performing multiple functions associated with such packet processing systems.

BACKGROUND OF THE INVENTION

As is known, during certain processes performed in a router or other type of packet switch of a packet processing system, packets may be segmented into subsets or portions of data referred to as "cells." For example, packets may be segmented into cells during router framing operations. However, these cells of data must be reassembled back into packets or protocol data units (PDUs) for use by other processes or functions performed in the router.

Conventional routers typically reassemble packets and store them in a common reassembly memory for subsequent use by multiple functions performed by the router. Such functions may include, for example, packet classification and packet scheduling. However, as is known, reassembling packets for use by such multiple functions requires very high input and output bandwidth.

The use of a common, high bandwidth memory to perform multiple functions has many significant drawbacks. First, such a high bandwidth memory can be quite expensive. It also typically causes any associated memory interface device to be expensive too because of requirements such as extra pins, special buffers and special control mechanisms. Further, the use of a common, high bandwidth reassembly memory makes the memory partitioning design task very difficult, particularly if the design is implemented in multiple integrated circuits.

It is therefore apparent that a need exists for techniques which address these and other drawbacks associated with the use of a common, high bandwidth memory for storing reassembled packets for subsequent use in multiple functions performed in a packet processing system.

SUMMARY OF THE INVENTION

The present invention provides packet processing techniques which employ multiple reassembly memories for performing multiple functions associated with a packet processing system thereby avoiding the drawbacks attributable to the conventional use of a common, high bandwidth memory.

In one aspect of the invention, a processing system comprises first processing circuitry for performing a first function, and first memory circuitry coupled to the first processing circuitry for storing received packets, wherein at least a portion of the packets stored by the first memory circuitry are usable by the first processing circuitry in accordance with the first function. The processing system further comprises at least second processing circuitry for performing a second function, and at least second memory circuitry coupled to the second processing circuitry for storing at least a portion of the same packets stored in the first memory circuitry, wherein at least a portion of the packets stored in the second memory circuitry are usable by the second processing circuitry in accordance with the second function.

Thus, the invention provides a packet processing system such that the memory required to perform the first and at least second functions is separately partitioned into a first memory and at least a second memory which respectively provide enough bandwidth to store the same data, or at least a subset of required data, and to allow performance of the corresponding function.

It is to be understood that the first processing circuitry, the first memory circuitry, the second processing circuitry and the second memory circuitry may be implemented on the same integrated circuit. Alternatively, the first processing circuitry and the first memory circuitry may be implemented on a first integrated circuit, and the second processing circuitry and the second memory circuitry are implemented on a second integrated circuit.

The processing system may also comprise first reassembly circuitry, coupled to the first memory circuitry, for reassembling subsets of received packets prior to storing the packets in the first memory circuitry, and at least second reassembly circuitry, coupled to the second memory circuitry, for reassembling at least a portion of the same subsets of packets reassembled by the first reassembly circuitry, prior to storing the packets in the second memory circuitry. The packet subsets are preferably cells.

The processing system may also comprise parsing circuitry, coupled to the first reassembly circuitry and the second reassembly circuitry, for parsing information from the received packets for use by the first reassembly circuitry and the second reassembly circuitry in respectively reassembling the packets.

In an illustrative embodiment, the first processing circuitry and the first memory circuitry comprise a network processor. In such case, the first function may be a packet classifying operation. Further, the second processing circuitry and the second memory circuitry may comprise a traffic manager. In such case, the second function may be a packet scheduling operation.

In another illustrative embodiment, the first processing circuitry and the second processing circuitry operate in a packet switching device such as a router. In such case, the first processing circuitry and the second processing circuitry operate between a packet network interface and a switch fabric of the packet switching device.

Advantageously, the packet processing techniques of the invention increase system performance and reduce system cost due to a reduction in required memory bandwidth associated with performing multiple functions and the associated impact of simplification in the overall processing system design.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with an exemplary packet processing system which includes packet reassembly operations. It should be understood, however, that the invention is more generally applicable to any packet processing system in which it is desirable to avoid the drawbacks attributable to the use of a common, high bandwidth memory.

It is to be understood that the term "processor" as used herein may be implemented, by way of example and without limitation, utilizing a microprocessor, central processing unit (CPU), digital signal processor (DSP), application-specific integrated circuit (ASIC), or other type of data processing device or processing circuitry, as well as portions and combinations of these and other devices or circuitry.

The present invention in an illustrative embodiment avoids the drawbacks attributable to the use of a common, high bandwidth reassembly memory by employing multiple reassembly memories for respectively performing multiple functions associated with multiple processors of a packet processing system. Among other advantages, the invention yields improved system performance and reduced design expense. Also, the invention yields reduced system expense. This is because it is often cheaper to have two memories of a given bandwidth rather than one memory of twice the bandwidth, the latter being what the conventional approach would require.

Figure 1:
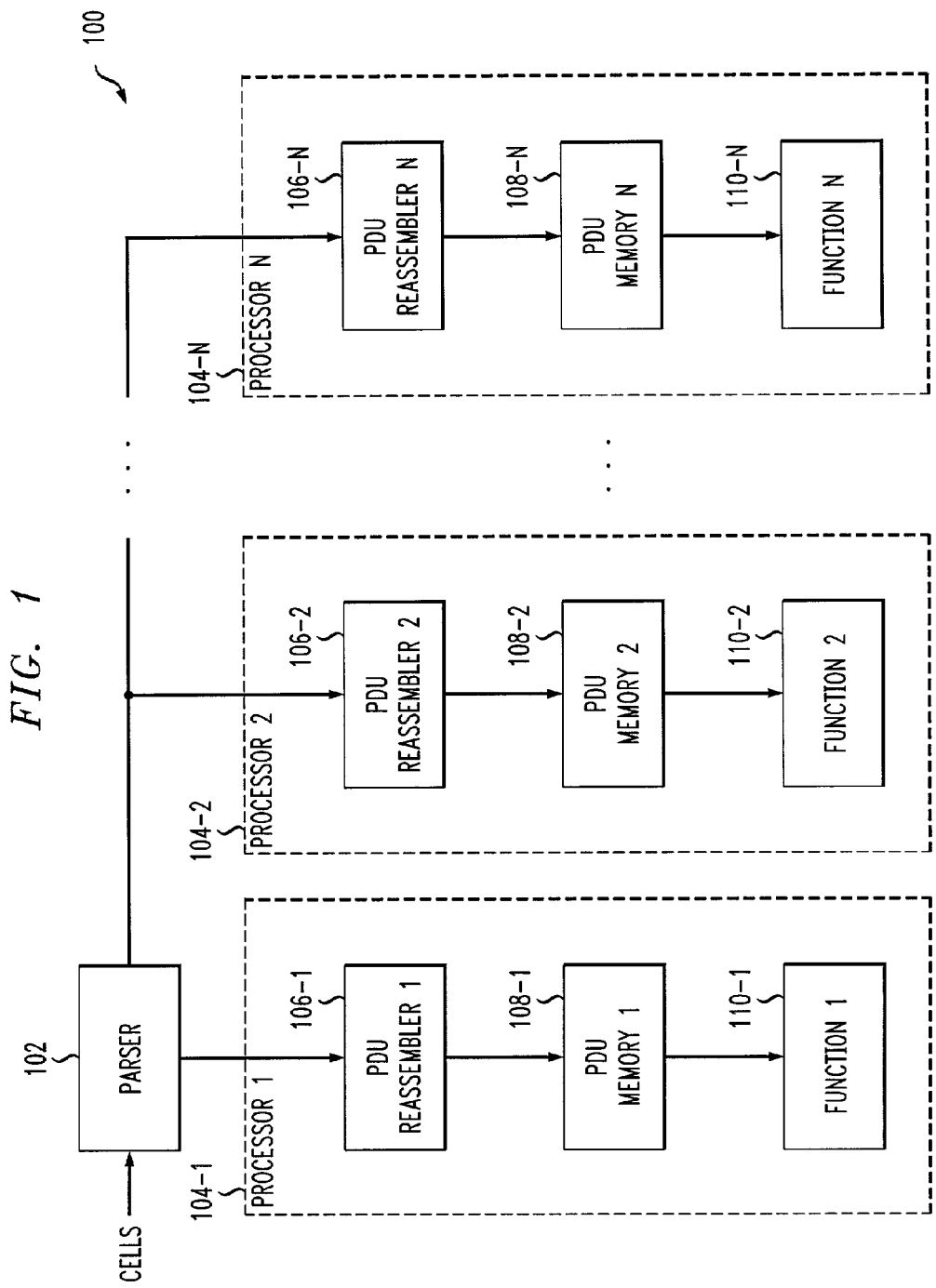
FIG. 1 is a block diagram illustrating a packet processing system employing multiple reassembly memories according to an embodiment of the present invention.

FIG. 1 shows a packet processing system 100 employing multiple reassembly memories according to an embodiment of the present invention. The system 100 includes a cell parser 102 and N packet processors 104-1 through 104-N, where N may be an integer equivalent to the number of processors that the processing system 100 is designed to support. Each packet processor 104 includes a packet or PDU reassembler 106 (106-1 through 106-N) and a PDU memory 108 (108-1 through 108-N). Each processor also has at least one packet-related function 110 (110-1 through 110-N) associated therewith.

It is to be understood that each processor may perform more than one function and that any two processors may perform distinct portions of the same function. Also, each of the N processors may be implemented on N, more than N, or less than N, integrated circuits or processing devices (including one integrated circuit or processing device).

Further, the packet processing system 100 may be implemented in a router or other type of packet switch. In such case, the functions to be performed by the respective processors in accordance with their respective reassembly memories may be, by way of example and without limitation, packet classification, packet scheduling, etc.

Advantageously, as shown, the packet processing system 100 is designed such that the memory required to perform the N functions is partitioned into N memories (108-1 through 108-N) which respectively provide enough bandwidth to reassemble the same data, or at least a selection of required data, to perform the corresponding function. Thus, the data may be reassembled and stored in parallel in each of the N memories. The parallel operations may be simultaneous or substantially simultaneous (e.g., delayed by some amount of time). Thus, the above-described drawbacks associated with a common, high bandwidth reassembly memory are advantageously avoided.

Figure 2:
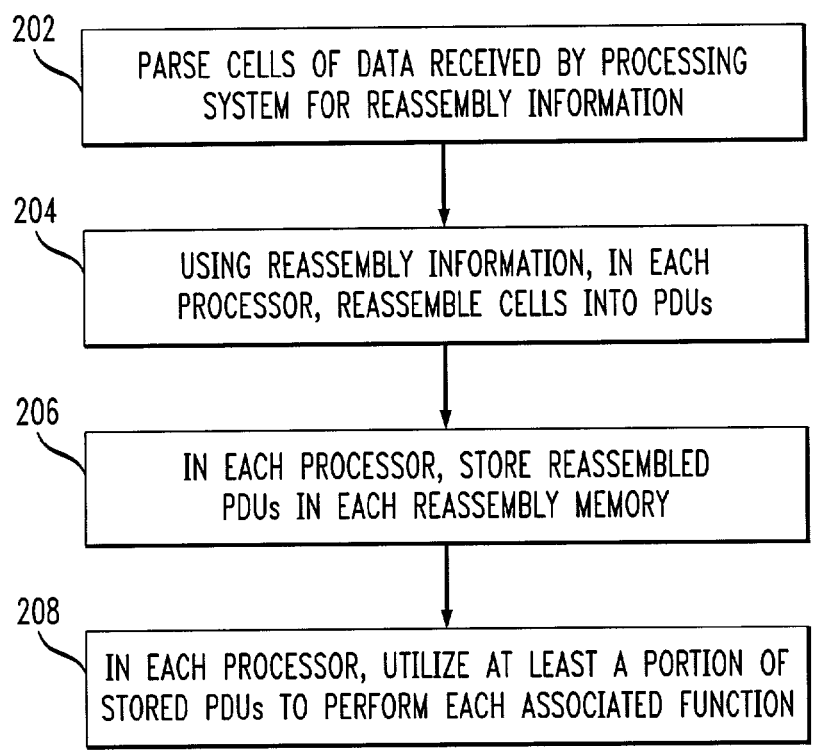
FIG. 2 is a flow diagram illustrating a packet processing methodology employing multiple reassembly memories according to an embodiment of the present invention.

FIG. 2 shows a packet processing methodology 200 employing multiple reassembly memories according to an embodiment of the present invention. Specifically, FIG. 2 will be described below with reference to the multiple reassembly memory arrangement shown in FIG. 1.

As mentioned above, during certain router processes (e.g., router framing operations), packets may be segmented into subsets or portions of data called "cells." Cells are therefore typically subsets of packets and may include a header and a payload. For example, a cell may include the beginning, middle, or end (or some combination thereof) of a full packet. However, all or some of these cells must be reassembled back into packets or PDUs for respective use by functions 110-1 through 110-N.

Thus, in step 202, cells received by the data processing system 100 are parsed by parser 102. The parsing operation includes extracting reassembly information from the cells. As is known, reassembly information is data which instructs the reassemblers 106 how to reassemble the data associated with a packet into its original order or sequence before the packet was segmented into cells.

In step 204, the reassembly information and the cells are passed from the parser 102 onto each reassembler 106 of each processor 104. The reassemblers then respectively reassemble the cells into PDUs, as is known, using the reassembly information.

It is to be understood that while all reassemblers may reassemble the same data, this is not required. That is, each reassembler may need only reassemble data specific to the function to be performed by its associated processor. Thus, the bandwidth and size of each reassembly memory may be tailored to the processing requirements of the function.

Next, in step 206, the reassembled PDUs are stored in each PDU memory 108 of each processor 104. Lastly, in step 208, the reassembled PDUs stored in each memory 108 (or at least a portion of such stored PDUs) are then utilized by each processor to perform each function 110.

As mentioned above, steps 204 through 208 of FIG. 2 may be performed in each processor simultaneously or substantially simultaneously, depending on the overall design of the packet processing system 100. However, this is not required.

Figure 3:
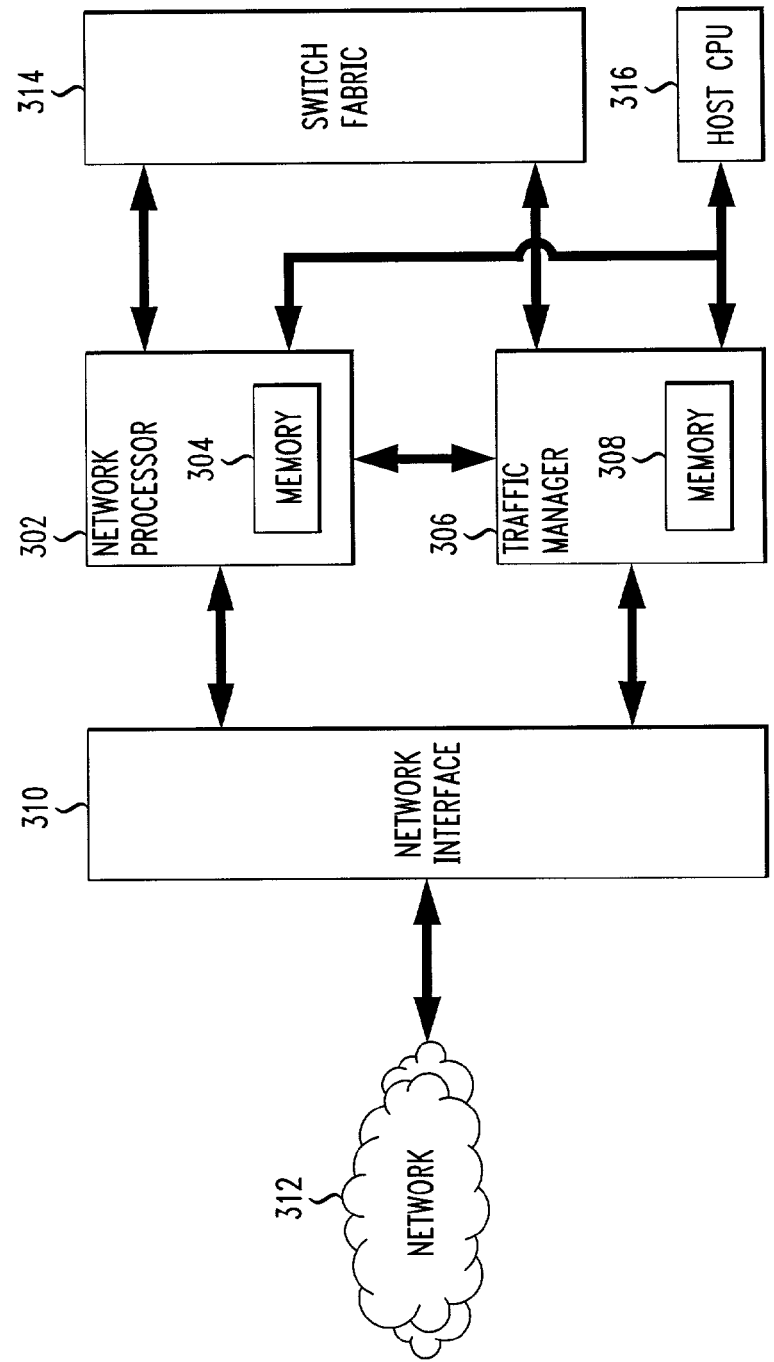
FIG. 3 is a block diagram illustrating a packet processing system employing two reassembly memories for respectively performing packet classification and packet scheduling functions according to an embodiment of the present invention.

Referring now to FIG. 3, a packet processing system 300 is shown employing two reassembly memories for respectively performing packet classification and packet scheduling functions in accordance with the present invention. More particularly, it is to be understood that FIG. 3 depicts a specific example (where N equals 2) of the processing system 100 of FIG. 1.

The packet processing system 300 includes a network processor 302 with a memory 304 and a traffic manager 306 with a memory 308. It is to be understood that in this exemplary embodiment, the network processor 302 with memory 304 represents one processor or processing circuitry with its corresponding reassembly memory circuitry, while the traffic manager 306 and memory 308 represent the other processor or processing circuitry with its corresponding reassembly memory circuitry.

As is known, a network processor such as is shown in FIG. 3 generally controls the flow of packets between a physical transmission medium, such as a physical layer portion of an asynchronous transfer mode (ATM) network or a synchronous optical network (SONET), and a switch fabric in a router or other type of packet switch. One function of a network processor is packet classification. A traffic manager such as is shown in FIG. 3 generally operates in conjunction with a network processor and performs, among other functions, buffer management and packet scheduling.

Accordingly, as shown, the network processor 302 and the traffic manager 306 are functionally positioned between a network interface 310, which provides an interface (e.g., a physical layer interface and framer) between the processors and a network 312 (e.g., ATM, SONET, etc.) and a switch fabric 314. The network 312 is a network from which packets or other packet data is received. The switch fabric 314 controls switching of packets. The two processors are also responsive to a host CPU 316 which may provide overall control over the two processors.

As is known, routers and switches generally include multiple processors, e.g., arranged in the form of an array of line cards with one or more processors associated with each line card. Thus, it is to be understood that in this embodiment the network processor 302 and the traffic manager 306 may represent processors implemented on a line or port card of a router or other type of packet switch. The network processor and traffic manager may be implemented on the same integrated circuit or different integrated circuits.

Thus, with reference back to the steps of FIG. 2 in view of this particular embodiment, cells in the system 300 (e.g., generated by segmentation associated with the network interface 310 and/or the switch fabric 314) are parsed for reassembly information (step 202). The parser may be implemented in either the network processor 302 or the traffic manager 306. Then, the cells may be simultaneously or substantially simultaneously reassembled (step 204) into original packets by each of the processors 302 and 306 and stored in their associated memories 304 and 308 (step 206). The reassembled packets stored in each memory are then utilized by each processor to perform each function (step 208), e.g., packet classification in the network processor 302 and packet scheduling in the traffic manager 306.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A processing system comprising:
   first processing circuitry operative to perform a first function;
   first reassembly circuitry, associated with the first processing circuitry, operative to reassemble segments of received packets into reassembled packets, wherein the segments reassembled by the first reassembly circuitry are related to the first function;
   first memory circuitry, associated with the first processing circuitry, operative to store the packets reassembled by the first reassembly circuitry, wherein the reassembled packets stored by the first memory circuitry are used by the first processing circuitry in accordance with the first function, wherein the first function comprises a post-reassembly function to process the reassembled packets stored in the first memory circuitry;
   second processing circuitry operative to perform a second function;
   second reassembly circuitry, associated with the second processing circuitry, operative to reassemble at least a portion of the same segments of packets reassembled by the first reassembly circuitry into reassembled packets, wherein the segments reassembled by the second reassembly circuitry are related to the second function; and
   second memory circuitry, associated with the second processing circuitry, operative to store the packets reassembled by the second reassembly circuitry, such that at least a portion of the reassembled packets stored in the first memory circuitry and the second memory circuitry are the same, wherein the reassembled packets stored in the second memory circuitry are used by the second processing circuitry in accordance with the second function, wherein the second function comprises a post-reassembly function to process the reassembled packets stored in the second memory circuitry,
   wherein the first reassembly circuitry, the first memory circuitry, and the first processing circuitry are configured to implement a first processing path;
   wherein the second reassembly circuitry, the second memory circuitry, and the second processing circuitry are configured to implement a second processing path; and
   wherein the first and second processing paths are distinct and operate in parallel.

2. The system of claim 1 wherein the first processing circuitry, the first reassembly circuitry, the first memory circuitry, the second processing circuitry, the second reassembly circuitry and the second memory circuitry are implemented on an integrated circuit.

3. The system of claim 1 wherein the first processing circuitry, the first reassembly circuitry and the first memory circuitry are implemented on a first integrated circuit, and the second processing circuitry, the second reassembly circuitry and the second memory circuitry are implemented on a second integrated circuit.

4. The system of claim 1 wherein the first function and the second function are performed by an integrated circuit.

5. The system of claim 1 wherein the first function and the second function are performed by different integrated circuits.

6. The system of claim 1 wherein the first processing circuitry, the first reassembly circuitry and the first memory circuitry comprise a network processor.

7. The system of claim 6 wherein the first function comprises a packet classifying operation.

8. The system of claim 1 further comprising parsing circuitry, coupled to the first reassembly circuitry and the second reassembly circuitry, for parsing information from the received packets for use by the first reassembly circuitry and the second reassembly circuitry in respectively reassembling the packets.

9. The system of claim 1 wherein the packet segments are cells.

10. A processing system comprising:
    first processing circuitry operative to perform a first function;
    first reassembly circuitry, associated with the first processing circuitry, operative to reassemble segments of received packets into reassembled packets, wherein the segments reassembled by the first reassembly circuitry are related to the first function;
    first memory circuitry, associated with the first processing circuitry, operative to store the packets reassembled by the first reassembly circuitry, wherein the reassembled packets stored by the first memory circuitry are used by the first processing circuitry in accordance with the first function;
    second processing circuitry operative to perform a second function;
    second reassembly circuitry, associated with the second processing circuitry, operative to reassemble at least a portion of the same segments of packets reassembled by the first reassembly circuitry into reassembled packets, wherein the segments reassembled by the second reassembly circuitry are related to the second function; and
    second memory circuitry, associated with the second processing circuitry, operative to store the packets reassembled by the second reassembly circuitry, such that at least a portion of the reassembled packets stored in the first memory circuitry and the second memory circuitry are the same, wherein the reassembled packets stored in the second memory circuitry are used by the second processing circuitry in accordance with the second function, wherein the second processing circuitry, the second reassembly circuitry and the second memory circuitry comprise a traffic manager.

11. The system of claim 10 wherein the second function comprises a packet scheduling operation.

12. A processing system comprising:
first processing circuitry operative to perform a first function;
first reassembly circuitry, associated with the first processing circuitry, operative to reassemble segments of received packets into reassembled packets, wherein the segments reassembled by the first reassembly circuitry are related to the first function;
first memory circuitry, associated with the first processing circuitry, operative to store the packets reassembled by the first reassembly circuitry, wherein the reassembled packets stored by the first memory circuitry are used by the first processing circuitry in accordance with the first function;
second processing circuitry operative to perform a second function;
second reassembly circuitry, associated with the second processing circuitry, operative to reassemble at least a portion of the same segments of packets reassembled by the first reassembly circuitry into reassembled packets, wherein the segments reassembled by the second reassembly circuitry are related to the second function; and
second memory circuitry, associated with the second processing circuitry, operative to store the packets reassembled by the second reassembly circuitry, such that at least a portion of the reassembled packets stored in the first memory circuitry and the second memory circuitry are the same, wherein the reassembled packets stored in the second memory circuitry are used by the second processing circuitry in accordance with the second function,
wherein the first processing circuitry and the second processing circuitry operate in a packet switching device,
wherein the first reassembly circuitry, the first memory circuitry, and the first processing circuitry are configured to implement a first processing path;
wherein the second reassembly circuitry, the second memory circuitry, and the second processing circuitry are configured to implement a second processing path; and
wherein the first and second processing paths are distinct and operate in parallel.

13. The system of claim 12 wherein the first processing circuitry and the second processing circuitry operate between a packet network interface and a switch fabric of the packet switching device.

14. A method for use in a processing system wherein the processing system is responsive to packets, the method comprising the steps of:
reassembling segments of received packets into reassembled packets in a first reassembler, wherein the segments reassembled by the first reassembler are related to a first function; and
storing the packets reassembled by the first reassembler in a first memory, wherein the reassembled packets stored by the first memory are used by a first processor in accordance with the first function, wherein the first function comprises a post-reassembly function to process the reassembled packets stored in the first memory;
wherein at least a portion of the segments of received packets reassembled by the first reassembler are reassembled in at least a second reassembler, wherein the segments reassembled by the second reassembler are related to a second function;
wherein the packets reassembled by the second reassembler are stored in at least a second memory such that at least a portion of the reassembled packets stored in the first memory and the second memory are the same, wherein the reassembled packets stored by the second memory are used by at least a second processor in accordance with a second function, wherein the second function comprises a post-reassembly function to process the reassembled packets stored in the second memory,
wherein the first reassembler, the first memory, and the first processor are configured to implement a first processing path;
wherein the second reassembler, the second memory, and the second processor are configured to implement a second processing path; and
wherein the first and second processing paths are distinct and operate in parallel.

15. The method of claim 14 wherein the first reassembler, the first processor, the first memory, the second reassembler, the second processor and the second memory are implemented on an integrated circuit.

16. The method of claim 14 wherein the first reassembler, the first processor and the first memory are implemented on a first integrated circuit, and the second reassembler, the second processor and the second memory are implemented on a second integrated circuit.

17. Apparatus for use in a processing system wherein the processing system is responsive to packets, the apparatus comprising:
a first memory;
a first processor operative to: (i) reassemble segments of received packets into reassembled packets, wherein the segments reassembled by the first processor are related to a first function; and (ii) cause the storage of the packets reassembled by the first processor in the first memory, wherein the reassembled packets stored by the first memory are used in accordance with the first function, wherein the first function comprises a post-reassembly function to process the reassembled packets stored in the first memory;
a second memory; and
a second processor operative to: (i) reassemble at least a portion of the segments of received packets reassembled by the first processor into reassembled packets that are stored in the second memory, such that at least a portion of the reassembled packets stored in the first memory and the second memory are the same, wherein the segments reassembled by the second processor are related to a second function, and wherein the reassembled packets stored by the second memory are used in accordance with the second function, wherein the second function comprises a post-reassembly function to process the reassembled packets stored in the second memory,
wherein the first memory and the first processor are configured to implement a first processing path;
wherein the second memory and the second processor are configured to implement a second processing path; and wherein the first and second processing paths are distinct and operate in parallel.

18. The apparatus of claim 17 wherein the first processor and the first memory, the second processor and the second memory are implemented on an integrated circuit.

19. The apparatus of claim 17 wherein the first processor and the first memory are implemented on a first integrated circuit, and the second processor and the second memory are implemented on a second integrated circuit.

20. A processing system comprising:
- first processing circuitry operative to perform a first function;
- first reassembly circuitry, associated with the first processing circuitry, operative to reassemble segments of received packets into reassembled packets, wherein the segments reassembled by the first reassembly circuitry are related to the first function;
- first memory circuitry, associated with the first processing circuitry, operative to store the packets reassembled by the first reassembly circuitry, wherein the reassembled packets stored by the first memory circuitry are used by the first processing circuitry in accordance with the first function;
- second processing circuitry operative to perform a second function;
- second reassembly circuitry, associated with the second processing circuitry, operative to reassemble at least a portion of the same segments of packets reassembled by the first reassembly circuitry into reassembled packets, wherein the segments reassembled by the second reassembly circuitry are related to the second function; and
- second memory circuitry, associated with the second processing circuitry, operative to store the packets reassembled by the second reassembly circuitry, such that at least a portion of the reassembled packets stored in the first memory circuitry and the second memory circuitry are the same, wherein the reassembled packets stored in the second memory circuitry are used by the second processing circuitry in accordance with the second function,
- wherein the at least a portion of the received packets are reassembled in parallel by the first and second reassembly circuitries and are stored in parallel by the first and second memory circuitries.

* * * * *